United States Patent
Baldis (10) Patent No.: US 12,414,644 B2
(45) Date of Patent: Sep. 16, 2025

(54) MULTI-PURPOSE HANGER FOR TREE ORNAMENTS

(71) Applicant: Sheri Baldis, Mars, PA (US)

(72) Inventor: Sheri Baldis, Mars, PA (US)

(73) Assignee: Sheri Baldis, Mars, PA (US)

( * ) Notice: Subject to any disclaimer, the term of this patent is extended or adjusted under 35 U.S.C. 154(b) by 0 days.

(21) Appl. No.: 17/380,598

(22) Filed: Jul. 20, 2021

(65) Prior Publication Data

US 2022/0022681 A1    Jan. 27, 2022

Related U.S. Application Data (60) Provisional application No. 63/055,524, filed on Jul. 23, 2020.

(51) Int. Cl.
A47G 33/10    (2006.01)

(52) U.S. Cl.
CPC .................... *A47G 33/10* (2013.01)

(58) Field of Classification Search
CPC ..................................... A47G 33/10
See application file for complete search history.

(56) References Cited

U.S. PATENT DOCUMENTS

| 364,752 | A | * | 6/1887 | Compton | ............... | A47H 13/04 |
| | | | | | | 24/710.2 |
| 533,385 | A | * | 1/1895 | Tweedale | ................. | A44C 1/00 |
| | | | | | | 24/336 |

(Continued)

FOREIGN PATENT DOCUMENTS

WO    2018234592 A1    12/2018

OTHER PUBLICATIONS

Tomlinson, M.; "Decorative Shower Curtain Hook Accents ... Bell Strands. Set of 12 ShowerCurtainBling"; p. 1-20; Available for sale in 2012; Accessed on Mar. 14, 2023 at https://www.etsy.com/listing/1145828877/decorative-shower-curtain-hook-accents?click_key=cb794fa5154bcf21a78cb5fef94b1c33aebc333d%3A114%E2%80%A6.*

(Continued)

*Primary Examiner* — Humera N. Sheikh
*Assistant Examiner* — Julia L Rummel
(74) *Attorney, Agent, or Firm* — Buchanan Ingersoll & Rooney PC (57) ABSTRACT

A hanger, that is particularly useful for hanging ornaments from a tree branch, has a body that is preferably made of wire which has preferably been bent to form a heart shape or an oval shape. The body has a curved portion at each end, the curved portions preferably having the same curvature. A side extends from each curved portion. The opposite ends of the sides are connected together or connected to a bottom. When the sides are connected together the curved portions may be opposite one another giving the body a heart shape. In the embodiment having an oval shaped body the curved portions are side by side and overlap one another when no forces are acting on the body. The wire has a spring like property and memory such that forces acting on the ends or sides of the hanger in an outward direction will move the ends away from one another creating a space between the ends that is sufficiently large to enable a tree branch to pass through the opening and be surrounded by the hanger. When the forces are removed the ends will move toward one another and the hanger will return to its original shape unless an object prevents that movement.

8 Claims, 7 Drawing Sheets

(56) References Cited

U.S. PATENT DOCUMENTS

| | | | | | |
|---|---|---|---|---|---|
| 1,542,706 | A | * | 6/1925 | Lang | A47G 33/10 40/667 |
| 1,854,245 | A | * | 4/1932 | Becht | B05C 1/022 118/DIG. 3 |
| 1,854,275 | A | * | 4/1932 | Rumpf | A47H 13/02 24/561 |
| 2,179,524 | A | * | 11/1939 | Schoeninger | A44B 15/00 70/459 |
| 2,452,286 | A | * | 10/1948 | Benjamin | A44C 5/0076 63/11 |
| 2,787,911 | A | * | 4/1957 | Kirkhof | F16B 2/248 74/100.1 |
| 2,843,910 | A | * | 7/1958 | Mruzek | F16B 2/248 24/270 |
| 3,333,307 | A | * | 8/1967 | Wheeler | A47G 33/10 40/667 |
| 3,704,487 | A | | 12/1972 | Mohr | |
| 4,173,667 | A | * | 11/1979 | Rusch | A47G 33/08 40/594 |
| 4,738,424 | A | | 4/1988 | Conner | |
| 4,943,326 | A | * | 7/1990 | Ozawa | C22F 1/006 148/564 |
| 5,383,638 | A | | 1/1995 | Dieringer et al. | |
| 5,788,201 | A | * | 8/1998 | Hardison | A01K 39/00 248/302 |
| 5,800,892 | A | * | 9/1998 | Yee | B44C 5/00 428/38 |
| 8,875,770 | B1 | * | 11/2014 | Martin | A47H 13/04 160/124 |
| 2003/0136149 | A1 | * | 7/2003 | Logan | A44C 11/002 63/38 |
| 2004/0055616 | A1 | * | 3/2004 | Twomey | A45D 8/20 132/277 |
| 2006/0202102 | A1 | | 9/2006 | Nieciecki | |
| 2012/0003404 | A1 | * | 1/2012 | Hamlin | A47G 33/10 29/525.08 |
| 2017/0013922 | A1 | * | 1/2017 | Vlad-Berindan | D04D 1/04 |

OTHER PUBLICATIONS

Spiningdaisy, "Hammer Metal Wavy Wire Choker Necklace", p. 1-5; Available for public sale on Oct. 31, 2016; Accessed on Jun. 4, 2024 at https://www.amazon.com/Spinningdaisy-Hammer-Metal-Choker-Necklace/dp/B01MQ3FPGE.*

Tammy, "Housing a Forest: How to Decorate a Christmas Tree with Jewelry", 2014, p. 1-13. Accessed at https://web.archive.org/web/20141227000655/http://www.housingaforest.com/how-to-decorate-a-christmas-tree-with-jewelry/.*

BJ's Craft Supplies, "Christmas Ornaments Kits and Decorations—Christmas Spider Ornament Kits" and "Earring Findings-Ear Wires, Earring Backs, Hoops, Blanks, and More", 2015, p. 1-3 and 1-4; Webpages accessed at https://web.archive.org/web/20150218044600/http://www.bjcraftsupplies.com/kits/ hol-christmas-ornament-kit01.asp and https://web.archive.org/web/20150218044435/http://www.bjcraftsupplies.com/jewelryFindings/ear01.asp.*

International Search Report for PCT/US2021/042471 dated Oct. 27, 2021.

Written Opinion of the International Searching Authority for PCT/US2021/042471 dated Oct. 27, 2021.

Amazon.com: Darice Green, Ornament Hangers, 2.5 Inches, 50 Pack.

Ornament Hooks—S Shaped/24 Pack/Old World Christmas; https://oldworldchristmas.com/...ent-s-hooks-ornament?gclid=EAIalQobChMIyMzX3PDd8QIVjajICh1f0AAXEAQYBSABEgIYvPD_BWE[Jul. 12, 2021 11:50:15 AM].

Factory Direct Craft: Silver Christmas ornament Hooks or hangers; https://factorydirectcraft.com/catalog/products/2149_2043_2095-110501-silver_christmas_ornament_hooks_or_hangers.html?ccset=US&autocs=1&auto_coupon=SUMMER21&gclid=EAIalQobChMIyMzX3PDd8QIVjajICh1f0AAXEAQYCSABEgKsOfD_BwE#.

KeySmart Belt Clip; https://www.getkeysmart.com/products/belt-clip.

\* cited by examiner

MULTI-PURPOSE HANGER FOR TREE ORNAMENTS

CROSS REFERENCE TO RELATED APPLICATION

This application claims the benefit of U.S. Provisional Application No. 63/055,524 filed Jul. 23, 2020.

FIELD OF INVENTION

The present invention relates generally to hooks and hangers. In particular, to hangers suitable for hanging an ornament on a branch of a tree.

BACKGROUND OF THE INVENTION

Most hooks, holders, hangers, and clips for hanging an ornament from a tree branch are made of metal wire formed with an open end, typically shaped as an inverted U which is placed over a branch and an opposite end which is attached to the ornament. The end which is attached to the ornament may be U-shaped, spiral shaped or a loop. The loop is usually formed by the end of the wire being bent back toward and passing over the lower portion of the hook. These hooks are popular because they are inexpensive, can hold a wide variety of ornaments and are easy to use. However, under certain expected and unexpected conditions, be it natural, animal, or manmade, situations arise that can cause the branch and/or the ornament to move dislodging the ornament from the branch. Usually when this occurs the ornament is damaged or broken, resulting in end-user's loss of investment.

Consequently there is a need for a hanger for hanging ornaments on a tree branch that will not slide off the branch when either the branch or the ornament are inadvertently moved. This hanger should also be able to hold a wide variety of ornaments and be easy to use.

SUMMARY OF THE INVENTION

I provide a hanger that is particularly useful for hanging ornaments from a tree branch. This hanger has a body that is preferably made of wire which has been bent to form a heart shape or an oval shape. The body has a curved portion at each end, the curved portions preferably having the same curvature. A side extends from each curved portion. The opposite ends of the sides are connected together or connected to a bottom. When the sides are connected together the curved portions are opposite one another giving the body a heart shape. When the bottom is curved the curved portions may overlap one another or be opposite one another. The wire has a spring like property or memory such that forces acting on the ends or sides of the hanger in an outward direction will move the ends away from one another creating a space between the ends. The space is sufficiently large to enable a small tree branch to pass through the opening and be surrounded by the hanger. When the forces are removed the ends will move toward one another and the hanger will return to its original shape unless an object prevents that movement. Conversely forces acting on the sides of the hanger in an inward direction will cause the ends of the hanger to move in the opposite direction.

To use the hanger for hanging an ornament from a tree branch the user first connects the hanger to an ornament. This can be done by threading one end of the hanger through an opening in the ornament that has been provided to receive a hook or ornament hanger. Then the hanger with the ornament is attached to a branch. This is done by moving the ends of the hanger away from one another and passing the branch through the gap created between the ends. After the branch is surrounded by the hanger, if the hanger body is heart-shaped the sides of the hanger should be squeezed together until the upper curved portions of the hanger are side by side defining an opening between the ends of the hanger. If the body is an oval shape, releasing the hanger will cause the body to return to its original position in which the upper curved portions of the hanger are side by side. That position need not be the exact some position in which the body was before and forces were applied to the body. The hanger is moved so that the branch is within the opening between the ends of the hanger and the hanger is released. The memory of the hanger can cause the ends of the hanger to press against opposite sides of the branch securely holding the ornament on the branch.

I prefer that the hanger be made of music wire, but other metal alloys having elasticity could be used. Alternatively the product could be made of other materials including but not limited to a suitable plastic, or other polymer; composites; ceramics; biomaterials; or yet unknown matter of composition or combination of materials that have sufficient elasticity to enable the hanger to be used as described above.

I further prefer that the hanger to be manufactured in various colors through the use, but not limited to such treatments as powder coating, plating, metallizing, painting, plastic coating or Teflon® coating. If desired one could apply other decorative features to the hanger such as glitter, rhinestones, crystals, beads or fabric.

The hanger can vary in size, thickness, shape, and scale determined by the necessary diameter required to enable the hanger to surround a branch or other structure from which the ornament will be hung as well as the environment in which the hanger will be used. Various uses include, but not limited to: indoor use; outdoor use; use with accessories or apparel use.

One may incorporate into the ornament hanger features or structures to improve the gripping or closure nature of the device. For example, all or portions of the hanger may be coated with a soft plastic or adhesive. One could also attach magnets to the hanger.

Although the hanger is preferably heart-shaped only the upper portion of the hanger need be configured like the upper portion of a heart. The lower portion may have a parabolic shape, a sinusoidal shape or be shaped like the letter W to allow more than one ornament or other object to be held. The sides could be shaped to form a geometric figure, such as a triangle or a star, to form an animal, such as a bunny, to form a person or to form other recognizable things, such as a snowman.

One or more hangers could be sold in a kit that contains decorative elements such as bows, beads, ribbons or tags that can be attached to the hanger. One could include an ornament or ornaments in the kit.

The hanger is suitable for indoor use and for outdoor use over a wide range of temperatures and weather conditions.

Although the present hanger can be used for hanging ornaments from a tree branch the hanger could be used for other purposes, Those purposes include attaching tags or other objects to apparel as well as hanging apparel, tools or other objects from a rod, rack or other structure.

Other objects and advantages of my hanger will become apparent from a description of certain present preferred embodiment thereof which are shown in the drawings.

DETAILED DESCRIPTION OF THE PREFERRED EMBODIMENTS

Figure 1:
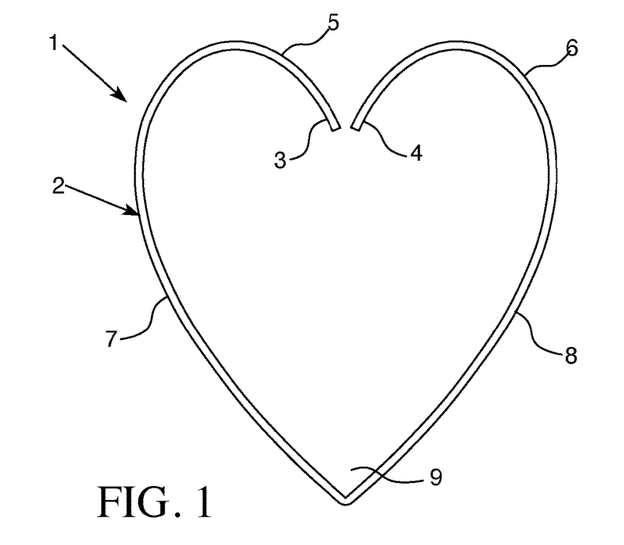
FIG. 1 is a front view of a first present preferred embodiment of my hanger in a relaxed position; the back view being identical to the front view.

Referring to FIG. 1 a present preferred embodiment of my hanger 1 has a generally heart-shaped body 2. The body is preferably made of wire which has been bent to form a heart shape. The ends 3, 4 of the wire are adjacent to one another and are free to move relative to one another. Each curved portion 5, 6 of the upper portion of the body extends from one of the free ends 3, 4 to one of the sides 7, 8 of the body. The lower ends of the sides meet at an acute angle creating a V-shape, Typically a portion of the ornament or other object that is being held by the hanger will be within the valley 9 created where the lower ends of the sides meet.

Figure 2:
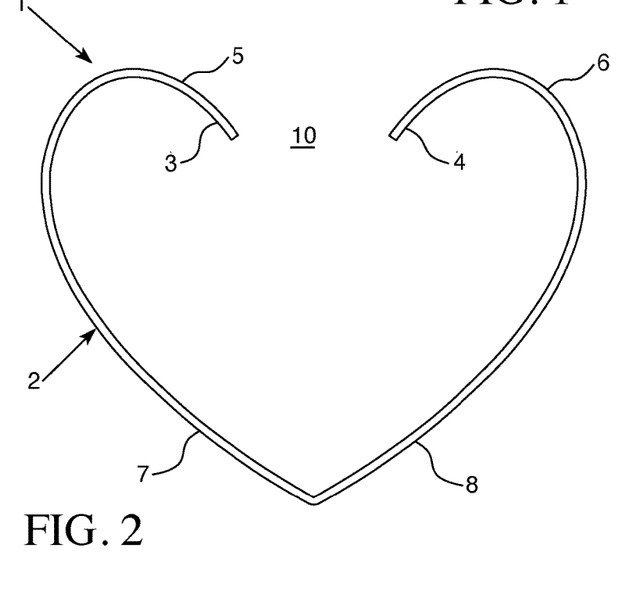
FIG. 2 is a front view of the hanger shown in FIG. 1 in an open position.
Figure 3:
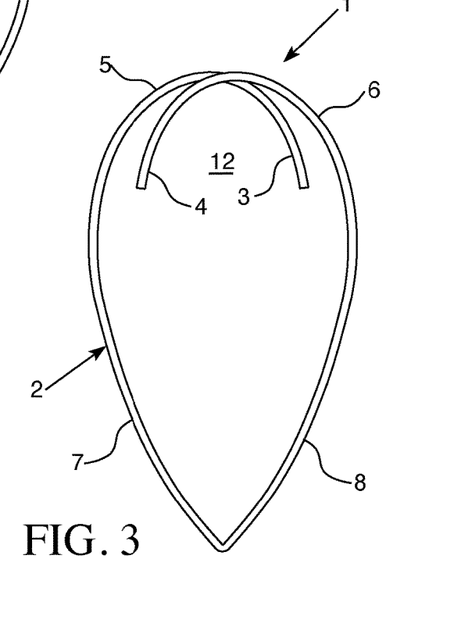
FIG. 3 is a front view of the hanger shown in FIGS. 1 and 2 in a closed gripping position.

The body 2 has sufficient elasticity and memory that forces acting on the free ends 3, 4 or sides 7, 8 of the body 2 in an outward direction will move the free ends 3, 4 away from one another creating a gap 10 between the ends giving the body the appearance shown in FIG. 2. The gap or space 10 between the ends 3, 4 is sufficiently large to enable a tree branch to pass through the gap and be surrounded by the body 2. When the forces are removed the free ends 3, 4 will move toward one another and the body 2 will return to its heart shape shown in FIG. 1 unless an object prevents that movement. Conversely forces acting on the sides 7, 8 of the hanger in an inward direction will cause the free ends 3, 4 of the body 2 to move past one another until the upper curved portions 5, 6 of the body 2 are side by side as shown in FIG. 3. Then the curved upper curved portions of the body are positioned as shown in FIG. 3. There is a space 12 between the free ends 3, 4 into which the tree branch or other supporting structure will fit.

Figure 4:
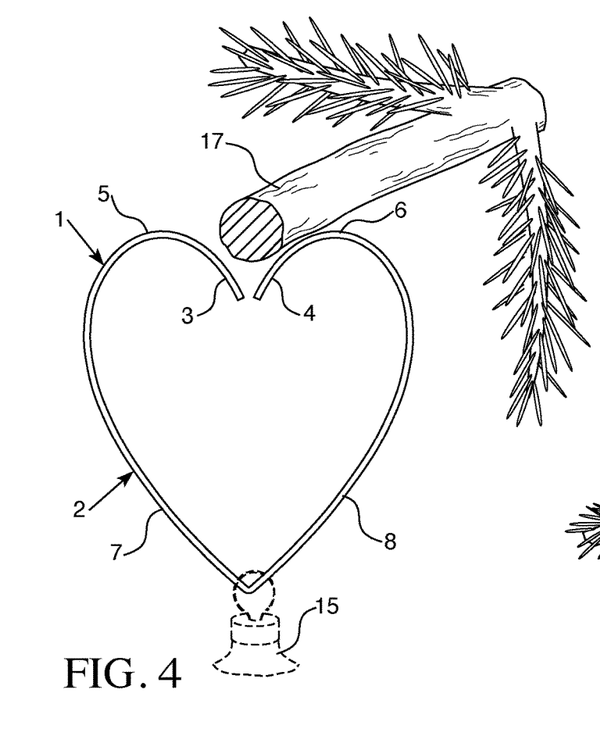
FIG. 4 is a perspective view of the hanger shown in FIG. 2 immediately prior to being attached to a supporting structure such as a tree branch.
Figure 5:
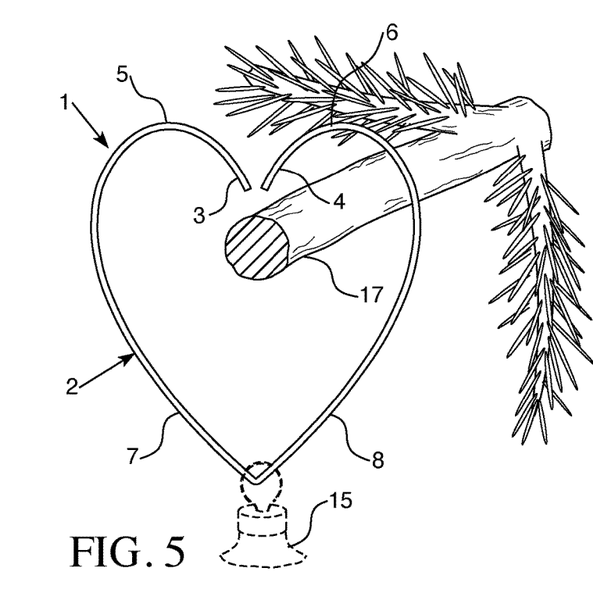
FIG. 5 is a perspective view of the hanger shown in FIG. 1 surrounding the tree branch shown in FIG. 4.
Figure 6:
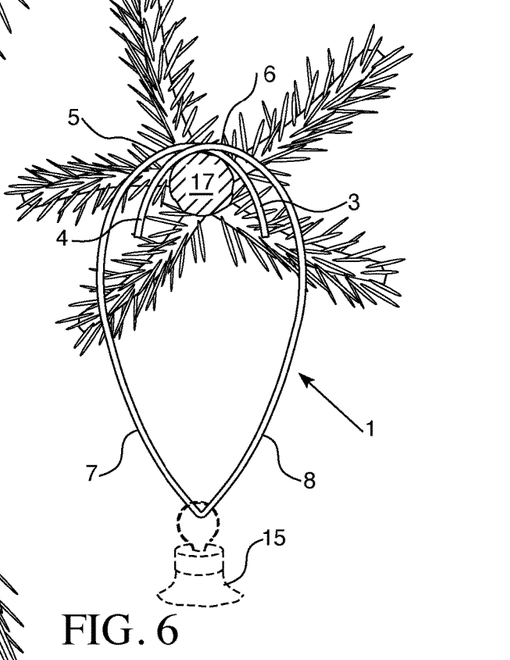
FIG. 6 is a front view of the hanger shown in FIG. 2 gripping the tree branch shown in FIGS. 4 and 5.

Referring to FIGS. 4, 5 and 6, to hang an ornament from a tree branch 17 or other support structure the user first connects the hanger 1 to the ornament. A portion of an ornament 15 is shown in broken line in FIGS. 4, 5 and 6. Connecting the ornament to the hanger can be done by threading one end of the hanger through an opening in the ornament that has been provided to receive a hook or ornament hanger. To attach the hanger to the tree branch the hanger can be positioned so that the tree branch 17 is located between the two upper curved portions 5, 6 of the body 2 as shown in FIG. 4 and the ornament 15, partially shown in broken line, is below the branch. Next the body 2 is pushed toward the branch 17 causing the ends 3, 4 to move away from one another until the gap 10 (See FIG. 2) between the ends is large enough that the branch 17 can pass through the opening and be surrounded by the body 2 of the hanger. FIG. 5 shows the branch surrounded by the body 2. After the branch is surrounded by the body 2 of the hanger 1, the sides 7, 8 of the hanger should be squeezed together until the upper curved portions 5, 6 of the hanger are side by side defining a space 12 between the ends 3, 4 of the hanger (see FIG. 3). The hanger is moved so that the branch 17 is within this space 12 and the hanger is released. The memory of the hanger will cause the ends 3, 4 of the hanger to move toward one another and, depending upon the size of the branch, may press against opposite sides of the branch 17 as shown in FIG. 6 securely holding the ornament on the branch.

Figure 7:
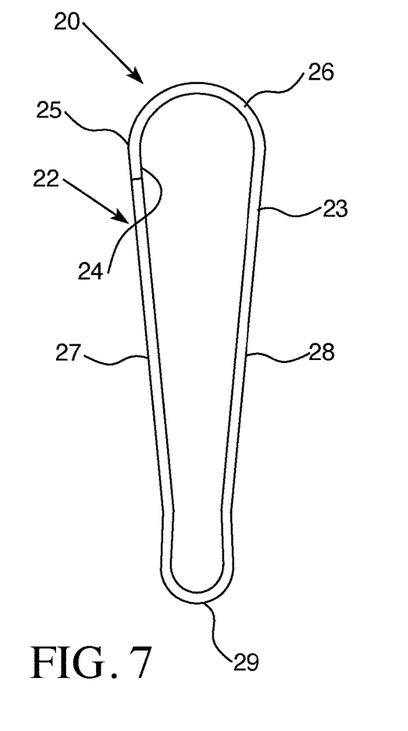
FIG. 7 is a front view of a second present preferred embodiment of my hanger.
Figure 8:
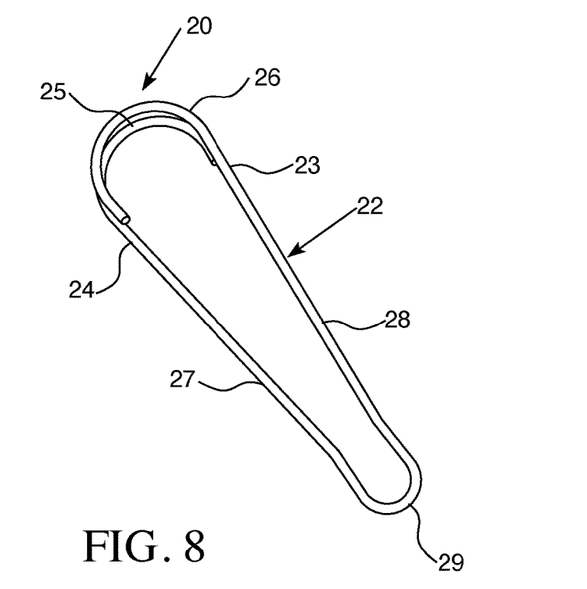
FIG. 8 is a perspective view of the embodiment shown in FIG. 7.

A second present preferred embodiment of my hanger 20 is shown in FIGS. 7 and 8. The body 22 in this hanger 20. The body 22 has a curved portion 25, 26 at each end. The curved portions are positioned beside one another and preferably have the same curvature. A side 27, 28 extends from each curved portion. The opposite ends of the sides are connected to a U-shaped bottom 29 such that the body has an elongated oval shape. The body 22 has sufficient elasticity and memory that forces acting on the sides 27, 28 of the body 22 in an outward direction will move the ends 23, 24 away from one another.

When the forces are removed the body will return to its original shape.

Original shape, when referring to the first embodiment means, shaped like a heart and, when referring to the second embodiment, means shaped like an oval. The body need not return to the exact shape in which the body was before any forces were applied to the sides.

If desired one may provide a coil in each of the sides. Then the sides would be similar in appearance and function like the sides in the hanger shown in FIG. 11.

To hang an ornament from a tree branch or other support structure with hanger 20 the user first connects the hanger to the ornament. This can be done by threading one end of the hanger through an opening in the ornament that has been provided to receive a hook or ornament hanger. To attach the hanger to a tree branch the user applies an outward force to the sides 27, 28 causing the curved portions 25, 26 to move away from one another until there is gap between ends 23, 24 that is large enough to enable the branch to pass through the opening and be surrounded by the body 22 of the hanger. After the branch is surrounded by the body 22 of the hanger 20, the sides 27, 28 of the hanger should be released allowing the upper curved portions 25, 26 of the hanger to return to a side by side position and the branch to move into the space between the ends 23, 24 of the hanger.

Figure 9:
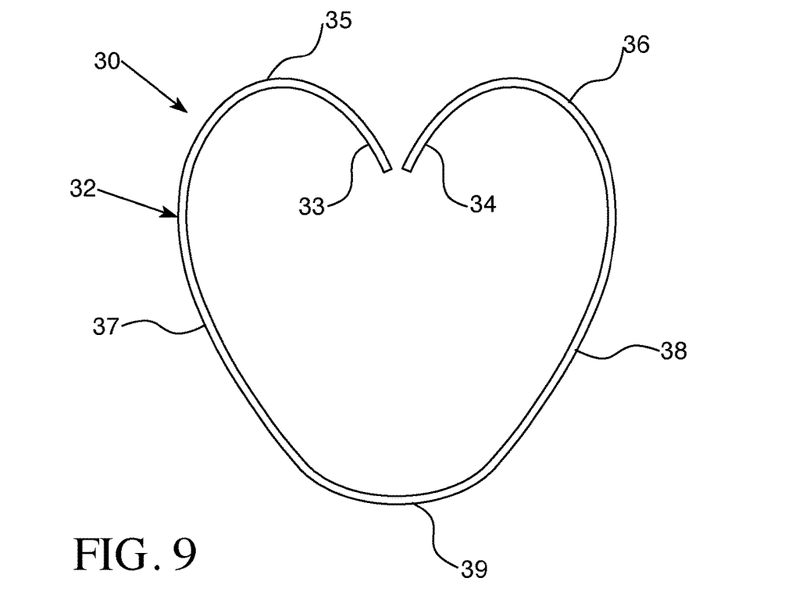
FIG. 9 is a front view of a third present preferred embodiment of my hanger.

A third present preferred embodiment of my hanger 30 is shown in FIG. 9. This embodiment is similar to the first present preferred embodiment but the lower portion or bottom 39 of the body 32 has a parabolic shape. Like the first embodiment the body 32 has ends 33, 34, curved portions 35, 36 and sides 37, 38. This hanger 30 is used in the same manner as the first embodiment.

Figure 10:
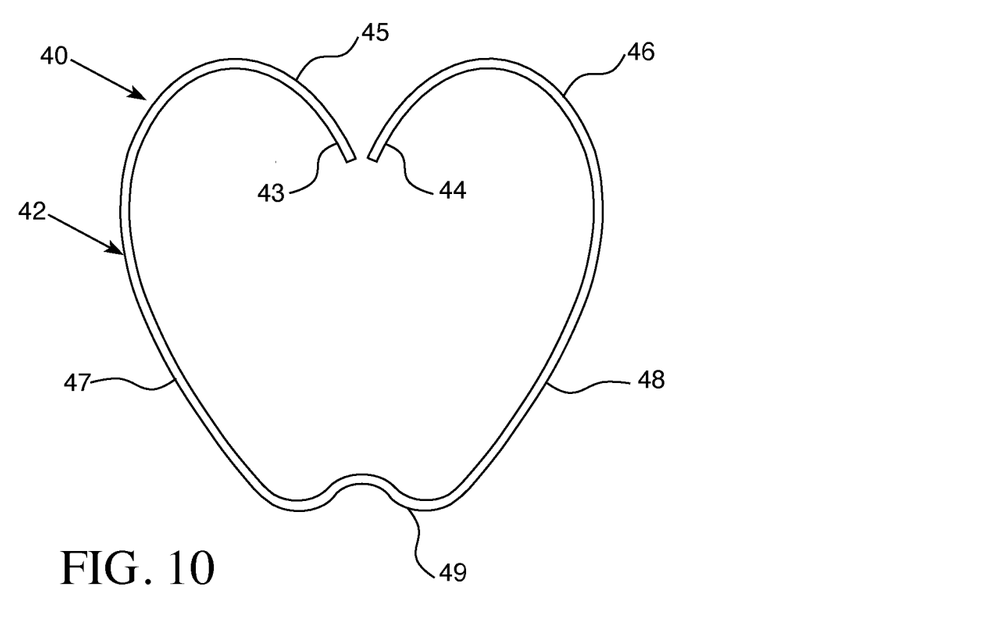
FIG. 10 is a front view of a fourth present preferred embodiment of my hanger.

As can be seen in FIG. 10 a fourth present preferred embodiment of my hanger 40 is configured to hold two ornaments. Like the first embodiment the body 42 has ends 43, 44, curved portions 45, 46 and sides 47, 48. In this embodiment the body has a bottom 49 shaped like the letter W. The lower end of each side 47, 48 is attached to a respective end of the bottom 49. In this embodiment one ornament can be held within one valley of the W-shaped bottom and another ornament can be held within one valley of the W-shaped bottom. The base can be modified to have a longer sinusoidal shape creating additional valleys to hold additional ornaments.

Figure 11:
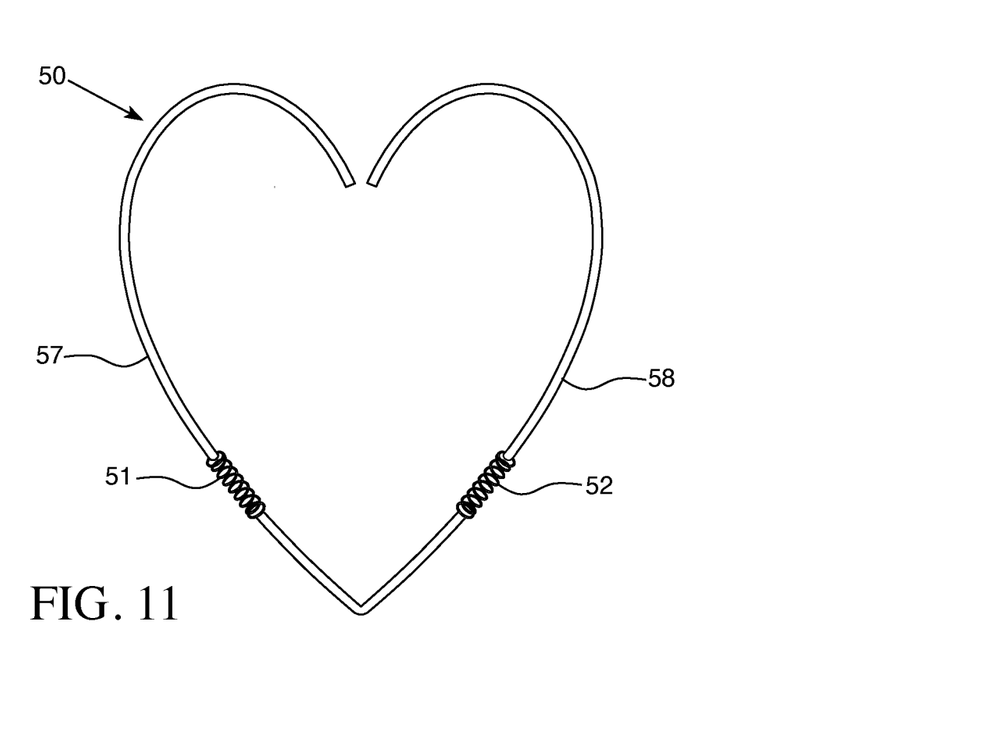
FIG. 11 is a front view of a fifth present preferred embodiment of my hanger.

In a fifth present preferred embodiment of my hanger 50 shown in FIG. 11, a portion 51, 52 of each side 57, 58 is coiled. The coiled portions provide spring properties to the sides such that the hanger 50 could be made from wire or other materials that have little or no elasticity. This hanger 50 can be used in the same manner as described above for using the first embodiment.

Figure 12:
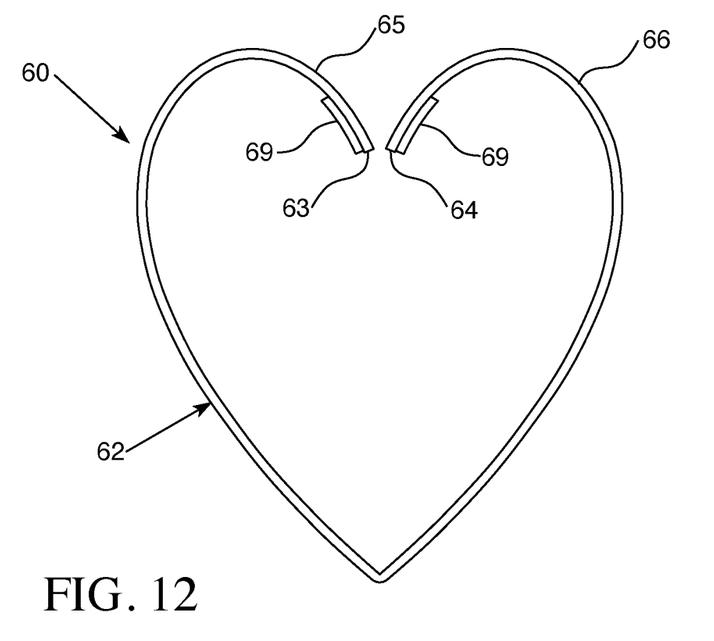
FIG. 12 is a front view of a sixth present preferred embodiment of my hanger.

A sixth present preferred embodiment of my hanger 60 shown in FIG. 12 is similar to the first embodiment. However, the ends 63, 64 and part of the curved portions 65, 66 of the body 62 are coated with a soft plastic or adhesive 69 to improve the grip of the ends on the branch or other structure to which the hanger is attached.

Figure 13:
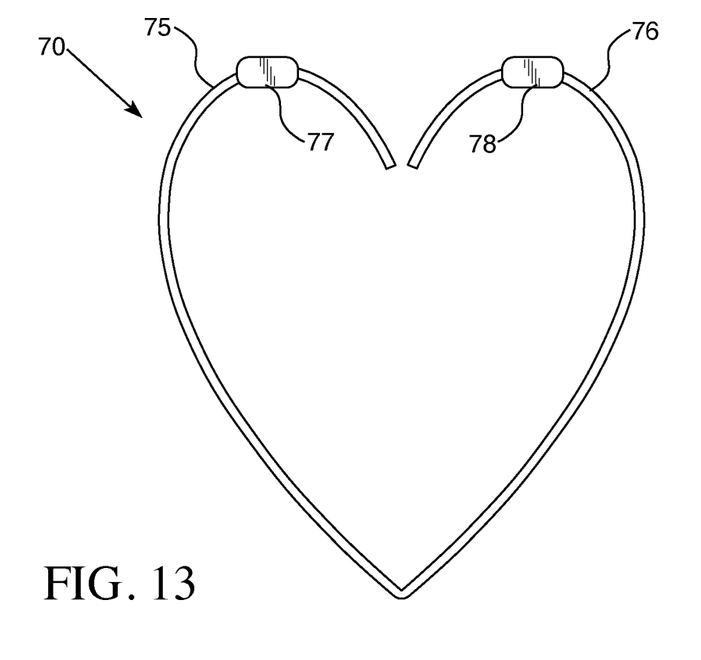
FIG. 13 is a front view of a seventh present preferred embodiment of my hanger.

FIG. 13 shows a seventh present preferred embodiment of my hanger 70. In this embodiment magnets 77 and 78 are provided on one or both faces of each curved portion 75, 76. When the hanger 70 is in the closed position (see FIG. 3) the magnets will hold the curved portions together.

In the embodiments shown in FIGS. 1-13 the curved portions have an arc shape and the sides are straight or substantially straight. However, the curved portions are not limited to that shape. For purposes of this invention the word curved means a continuous line that moves from a starting point to an end point around a fixed point, the starting point being in a different location than the end point. The embodiments shown in FIGS. 14 and 16 have curved portions which are not arcs.

Figures 14, 15, 16:
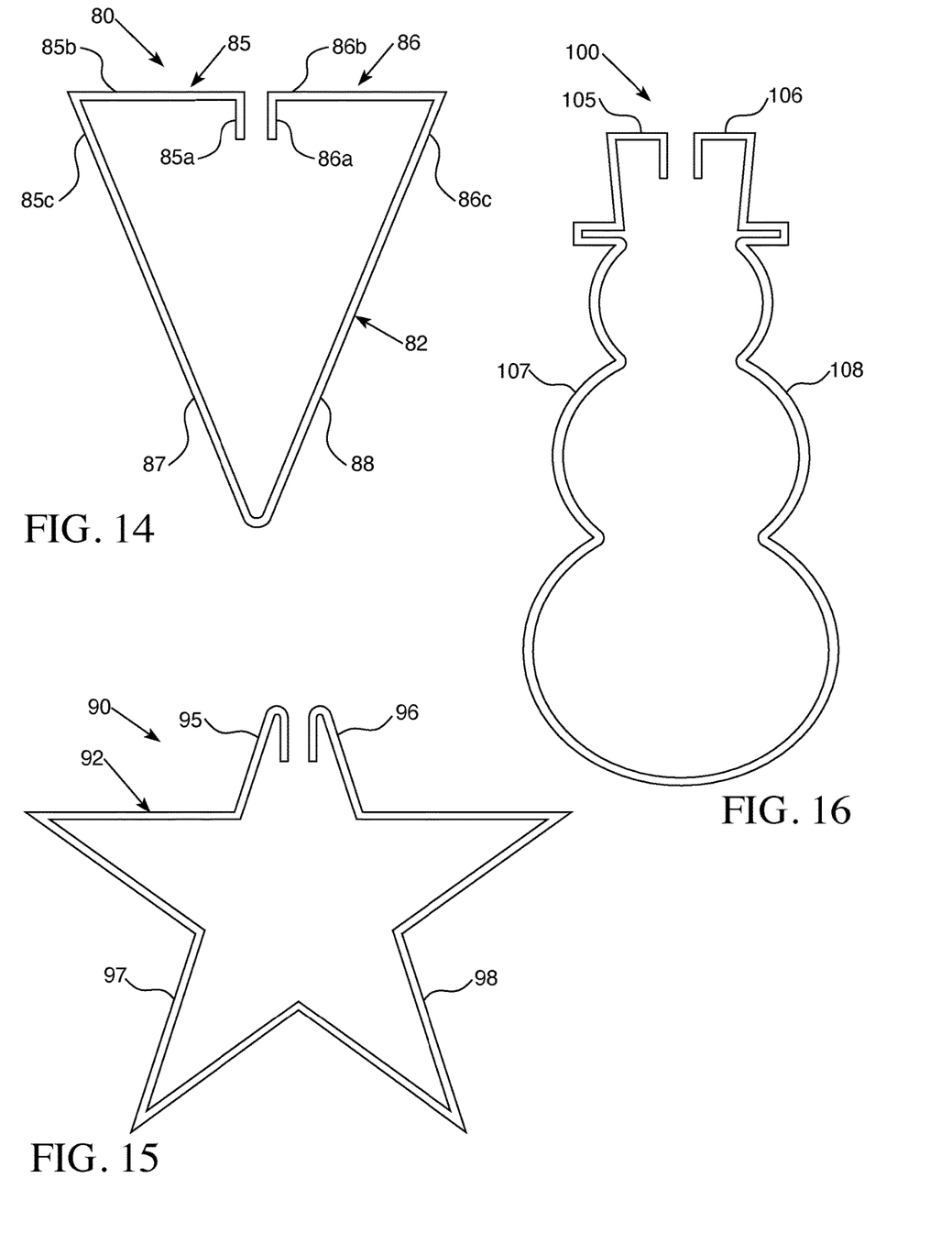
FIG. 14 is a front view of an eighth present preferred embodiment of my hanger.
FIG. 15 is a front view of a ninth present preferred embodiment of my hanger.
FIG. 16 is a front view of a tenth present preferred embodiment of my hanger.

The body 82 in the eighth present preferred embodiment 80 shown in FIG. 14 is shaped like a triangle. Each curved portion 85, 86 contains three parts, a vertical part 85a, 86a, a horizontal part 85b, 86b and an angled part 85c, 86c which is attached to a side 87, 88. This embodiment is used in the same manner as the first embodiment.

The sides in the embodiments shown in FIGS. 1-14 are straight or substantially straight. However, straight sides are not required. The sides may have curves, bends or corners and may vary in thickness along their length. Furthermore, the sides could be shaped to form a geometric shape, such as a triangle or a star, to form an animal, such as a rabbit, to form a person or to form another recognizable thing, such as a snowman.

In the ninth present preferred embodiment of my hanger 90 shown in FIG. 15, the body 92 is shaped like a star when the hanger is hanging on a branch. The curved portions 95, 96 are shaped like an inverted letter U or letter V. The curved portions overlap when the hanger 90 is hung on a branch and form the head of the star. The sides 97, 98 are each configured as an arm and a leg of a star.

Referring to FIG. 16, the tenth preferred embodiment 100 is shaped like a snowman. The curved portions 105, 106 each have three straight segments that form the snowman's top hat when the curved portions overlap one another. The sides 107, 108 define the snowman's head and body.

Figure 17:
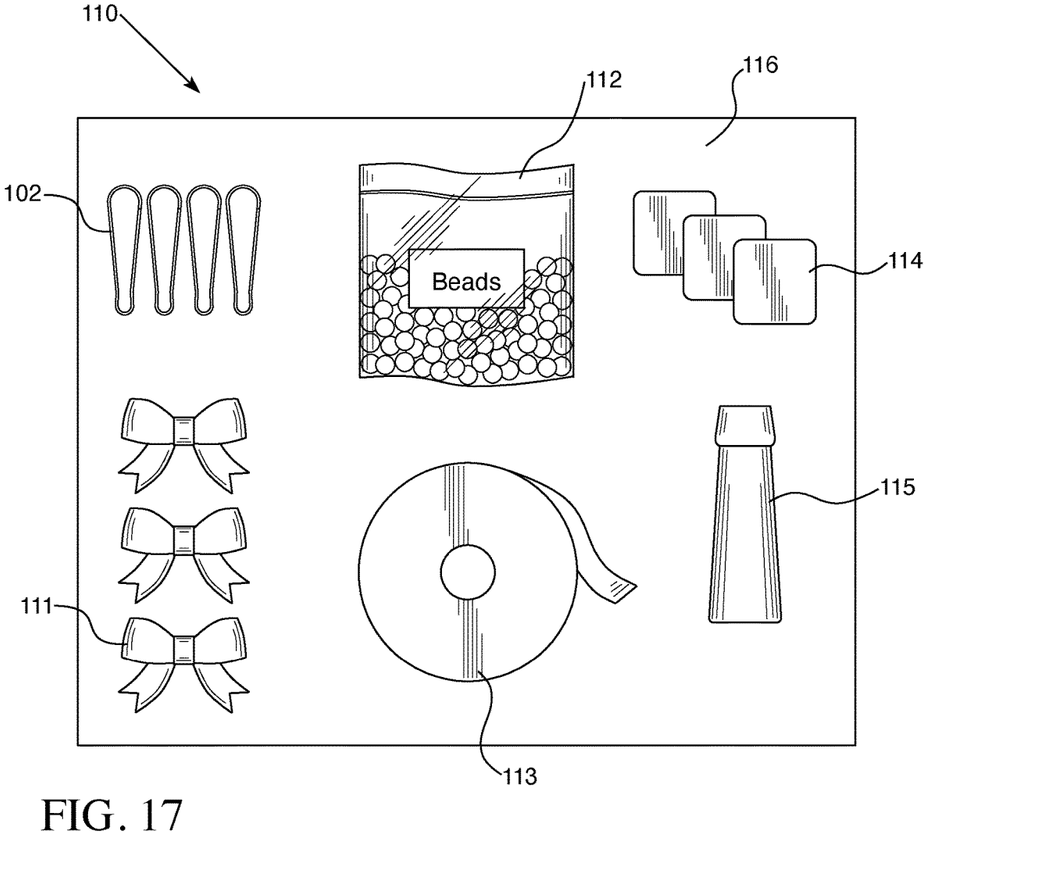
FIG. 17 is a front view of a kit containing the second present preferred embodiment of my hanger with decorative items that can be attached to the hanger.

Any embodiment or embodiments of the hanger can be sold in a kit with craft items such as glue as well as bows, beads, ribbons and tags that can be attached to the hanger. One such kit 110 is shown in FIG. 17. The kit contains several hangers 102, bows 111, a package of beads, 112 a roll of ribbon 113, tags 114, and a tube of glue 115 all in a container 116, The glue may be clear, or a selected color or contain glitter. One could include an ornament or ornaments in the kit.

The hanger can vary in size, thickness, shape, and scale determined by the necessary diameter required to enable the hanger to surround a branch or other support structure from which the ornament will be hung as well as the environment in which the hanger will be used.

I prefer that the hanger be manufactured in various colors through the use, but not limited to, such treatments as powder coating, plating, metallizing, painting, plastic coating or Teflon® coating. If desired one could apply other decorative features to the hanger such as glitter, rhinestones, crystals, beads or fabric.

While the preferred embodiments are made of wire, specifically music wire, the product could be made of other materials including but not limited to a suitable plastic, or other polymer; composites; ceramics; biomaterials; or other materials or combination of materials that have sufficient elasticity to enable the hanger to function and be used as described above.

The preferred embodiments have been described as being used for hanging ornaments from a tree branch, but the hanger could be used to hang ornaments from other structures such as a railing. Furthermore, the hanger can be used for many other purposes, Those purposes include hanging signs, attaching tags or other objects, and hanging apparel, tools or other objects from a rod, rack or other structure. The hanger could be used to hang a bird feeder. Medical professionals could use the hanger to hold an IV bag and tubing on a stand.

Although I have shown and described certain present preferred embodiments of my hanger and methods for using the hanger, my invention is not limited thereto but may be variously embodied within the scope of the following claims.

I claim:

1. A hanger for hanging an ornament on a tree branch comprised of a unitary body having:
   a first free end at which the unitary body terminates,
   a second free end positioned opposite the first free end at which the unitary body terminates,
   a first curved portion extending from the first free end and defining a first space of sufficient size to enable the first curved portion to press against a tree branch that is within the first space,
   a second curved portion extending from the second free end and defining a second space of sufficient size to enable the second curved portion to press against a tree branch that is within the second space, the first free end and the first curved portion being beside the second curved portion,
   a first side having a first end and a second end and a straight portion between the first end and the second end of the first side, the first end of the first side attached to the first curved portion, a second side having a first end and a second end and a straight portion between the first end and the second end of the second side, the first end of the second side attached to the second curved portion, and a bottom having a first end and a second end, the first end of the bottom attached to the second end of the first side, and the second end of the bottom attached to the second end of the second side such that the first side, second side and bottom define a third space and the first space, second space and third space define a first unobstructed space, wherein the sides are moveable relative to one another to a selected relative position in which the first free end entirely overlays a portion of the second side proximate the first end of the second side and the second free end entirely overlays a portion of the first side proximate the first end of the first side, the unitary body having sufficient elasticity and memory such that forces acting on at least one of the free ends and the sides in an outward direction will move at least one of the first curved portion and the second curved portion away from one another wherein, when moved, the first curved portion is moved through and within a first plane passing through the first curved portion and the first side and, when moved, the second curved portion is moved through and within a second plane passing through the second curved portion and the second side to a position where the free ends and the curved portions do not overlap any curved portion or side, an unobstructed space exists between the free ends, and the sides are spaced apart from one another to form a fourth space between the sides such that the first space, second space and fourth space define a second unobstructed space and when the forces are removed the body will return to its original shape.

2. The hanger of claim 1, wherein the body is comprised of a material selected from the group consisting of plastic, metal, music wire, spring wire, high-carbon steel, stainless steel, composites, ceramics, polymers and biomaterials.

3. The hanger of claim 1, further comprising a coating on at least a portion of the body, the coating selected from the group consisting of a plastic, an adhesive, a metal powder, paint, enamel, electroplating, metal plating, glitter, rhinestones, crystals and fabric.

4. The hanger of claim 1, wherein the bottom has a parabolic shape or sinusoidal shape.

5. The hanger of claim 1, wherein the sides form a geometric figure, an animal, a person or a snowman.

6. The hanger of claim 1, wherein each side contains a coil.

7. A kit comprising:
at least one hanger for hanging an ornament on a tree branch according to claim 1;
at least one craft item selected from the group consisting of bows, beads, tags, ribbon, glitter and glue; and
a container holding the at least one hanger and the at least one craft item.

8. The kit of claim 7, comprising:
The ornament, the container holding the ornament.

* * * * *